S. RADIMAK.
DOLL MOLDING MACHINE.
APPLICATION FILED NOV. 28, 1919.
1,359,102.
Patented Nov. 16, 1920.
2 SHEETS—SHEET 1.
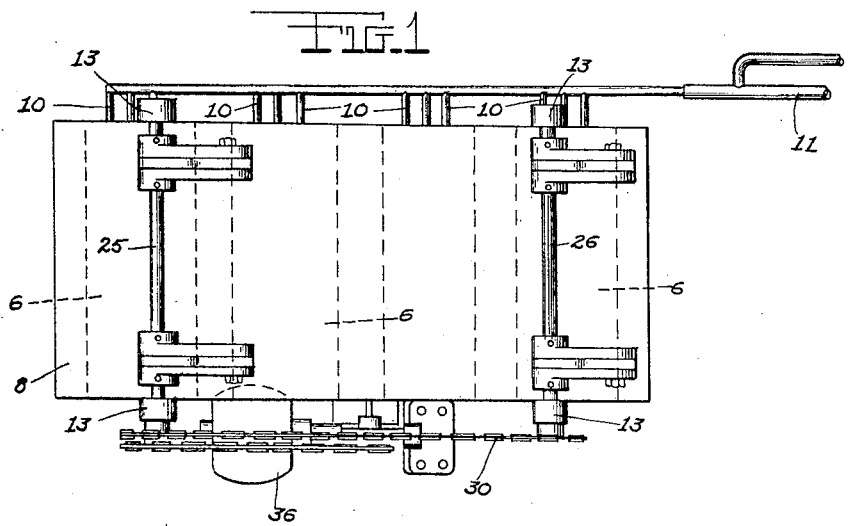
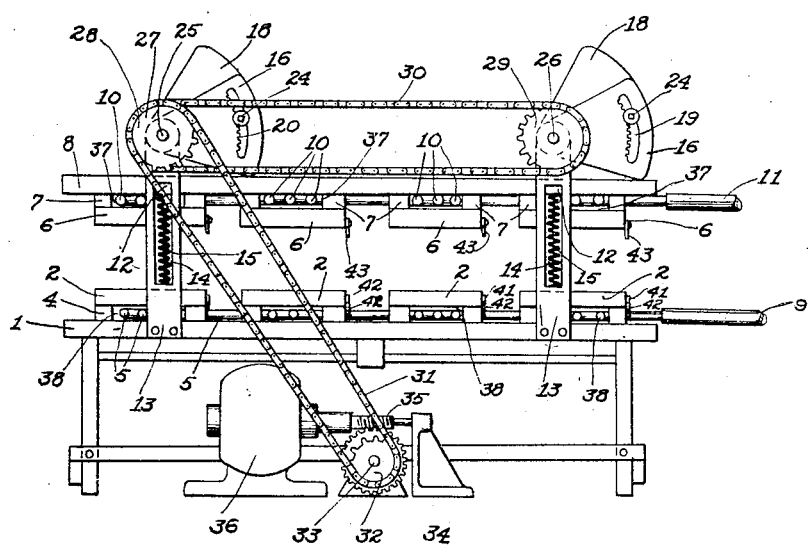
INVENTOR.
Steven Radimak
BY
Harry Jacobson
ATTORNEY.

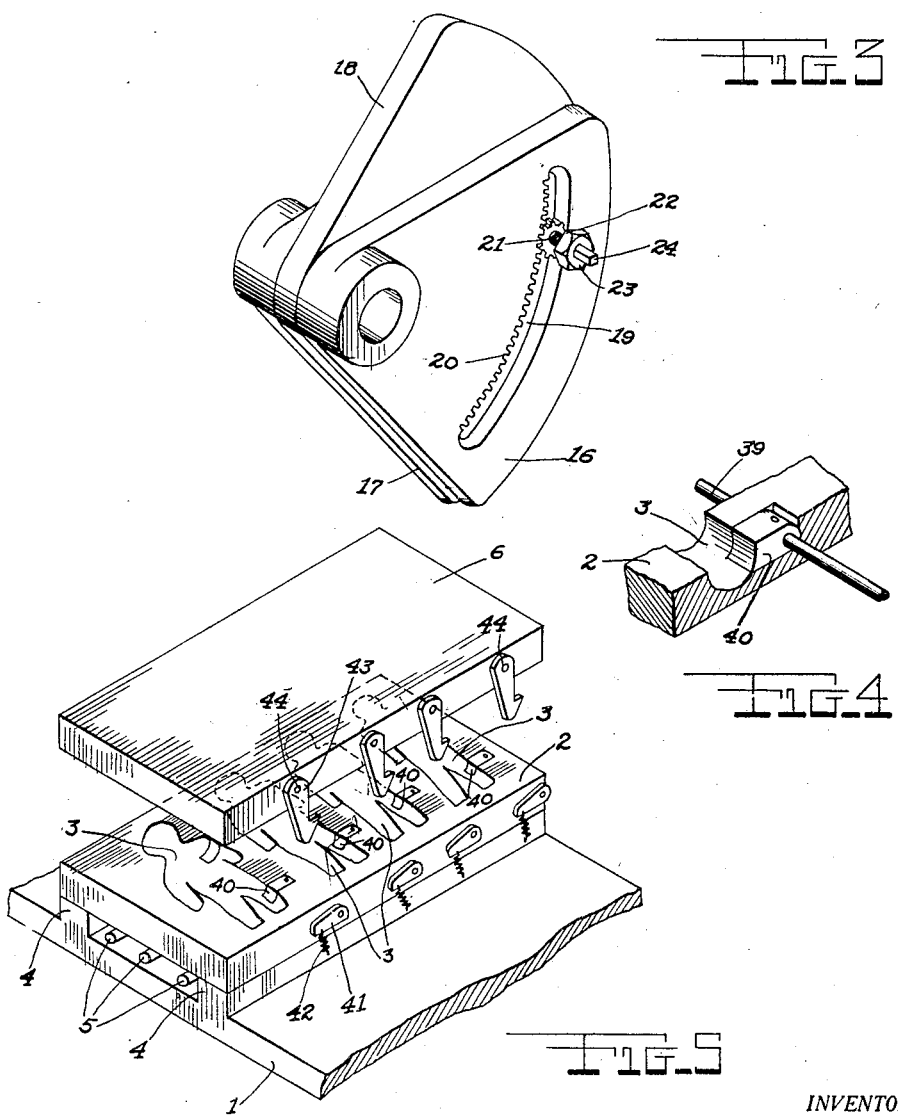

UNITED STATES PATENT OFFICE.

STEVEN RADIMAK, OF NEWARK, NEW JERSEY.

DOLL-MOLDING MACHINE.

1,359,102.    Specification of Letters Patent.    Patented Nov. 16, 1920.

Application filed November 28, 1919. Serial No. 341,221.

*To all whom it may concern:*

Be it known that I, STEVEN RADIMAK, citizen of the United States, and resident of Newark, in the county of Essex and State of New Jersey, have invented certain new and useful Improvements in Doll-Molding Machines, of which the following is a specification.

This invention relates to machines for making dolls and is especially applicable to that type of machine which shapes doll halves under pressure from a loose granular composition.

The object of this invention is the provision of mechanism for molding doll halves at comparatively high speed.

A further object of this invention is to provide means for quick drying of the dolls during the molding operation.

For the attainment of these and other objects, I employ the mechanism shown in the accompanying drawings, in which—

Figure 1 is a plan view of my improved mechanism, showing the means for operating the die.

Fig. 2 is a front view of the machine.

Fig. 3 is a perspective view of the die-operating cam.

Fig. 4 is a perspective view of a portion of the mold or matrix showing the movable part of the mold, used for separating the molded doll from the matrix.

Fig. 5 is a perspective view of the major part of my improved machine showing the means for separating the doll from the mold.

In the practical embodiment of my invention, the table 1 supports the mold plate 2, in which are cut the molds or matrices 3, suitable for molding half of a doll. The die plate 6, carrying dies attached thereto but not shown, which conform to the shape of the mold and are of such size as to form a doll of the required thickness between said dies and said matrices, is supported by blocks 7 from movable table 8, whereby openings 37 are provided above said dies. Blocks 4 of table 1 support plate 2, leaving openings 38 thereunder for pipes 5, which are provided with gas fuel through inlet pipe 9. Said pipes 5 are provided with suitable outlets for lighting the gas to heat the matrices 3. Gas pipes 10, in opening 37, are supplied through inlet pipe 11 and have suitable outlets for lighting the gas to heat the dies.

Die table 8 has lugs 12 thereon adapted to slide in grooves 14 of supporting arms 13. Said lugs 12 rest on compression springs 15 of sufficient strength to hold table 8 normally in its uppermost position.

For lowering said die tables and dies, a series of adjustable cams, mounted on shafts 25 and 26, is used, said shafts 25 and 26 being supported by arms 13. Each of said cams is composed of three separate cam parts, all of which, are of the same shape, the major portion of the cam curve being circular. Cams 16 and 17, being two of said main cam parts, are mounted on shafts 25 and 26 for rotation therewith and are spaced apart, cam 18 being loosely mounted on shafts 25 and 26 in the space between cams 16 and 17. Shaft 22 passes through a hole in cam 18, in which cam it is free to rotate, and passes also through slots 19 in cams 16 and 17, teeth 20 being cut on one side of said slots 19. Gears 21 are mounted on shaft 22 for rotation therewith and mesh with teeth 20 of cams 16 and 17. The end 24 of shaft 22 is made square to allow said shaft to be rotated by means of a hand crank or wrench, whereby gears 21 are rotated causing cams 16 and 17 to move relatively to cam 18 for adjusting the length of the circular portion of the complete cam. A thread is cut on that part of shaft 22 which projects beyond cam 16, nut 23 turning on said thread for tightening said nut against gear 21 and cam 16 for preventing rotation of the gear.

On the ends of shafts 25 and 26 are mounted sprocket wheels 28 and 29 respectively connected by chain 30. Sprocket wheel 27 is mounted on shaft 25 outside of wheel 28, and is connected by means of chain 31 to sprocket wheel 32 on shaft 33. Worm wheel 34 is also mounted on shaft 33 and is operated through worm 35 by a source of power as motor 36. The various driving parts are so proportioned that the die table is capable of very slow reciprocation, thereby allowing time for the heated dies to harden and dry out the molded doll, giving time also for the removal of the dolls and for the addition of a new supply of composition to the matrices. The composition used is a loose granular mixture, such as a combination of sawdust with a binder.

For separating the molded doll from matrix 3, a pusher 40 comprising a portion of said matrix Figs. 4 and 5 is pivoted on shaft 39 in plate 2, and has crank 41 mounted on one end thereof. Said crank is pivoted on the shaft at one end, while tension spring 42 is attached at the other end thereof to hold said crank down, in its normal position. To operate said pusher, a hook arm 43, attached to plate 6 at 43, is provided for engaging crank 42 on the downward movement of said die plate 6 and for raising said crank on the upper movement of said plate.

The operation of my improved machine is as follows:

Die plate 6 being in its highest position, the composition is placed in the various matrices. Power being supplied to motor 36, worm 35 is rotated, thereby turning worm wheel 34, sprocket wheel 32 and therethrough chain 31. Said chain operates sprocket wheels 27 and 28 on shaft 25, and through said wheel 28 and chain 30, wheel 29 and shaft 26 are rotated. The cams on shafts 25 and 26, having been adjusted by turning shaft 24 in the proper direction to increase or decrease the size of the circular segment of said cams, are operated by shafts 25 and 26 and act to lower table 8 against the pressure of springs 15. The circumference of the circular segment of the adjusted cam, determines the interval during which the dies are held stationary in matrices 3 for the drying out of the doll. On the downward movement of table 8, arm 44 slides past crank 41, the hook on said arm catching underneath said crank. The gas heaters 5 and 10 having been lighted, the dies and matrices are sufficiently hot so that the composition caught between the dies and matrices is not only compressed and molded into proper shape, but at the same time is heated for quick drying time.

Further rotation of shafts 25 and 26 raises said cams from table 8 allowing said table to rise under the action of springs 15. Arm 44, on this upward movement, raises crank 41 against the action of spring 42, whereby shaft 39 is rotated, pusher 40 raised, and the molded doll separated from the matrix. The dolls can now be removed, a new supply of composition put into the matrices, and the operation repeated as before.

What I claim is:

1. In a doll molding machine, the combination of a matrix for receiving a composition, a die for coaction with said matrix for compressing and shaping said composition, means for heating said matrix, means for heating said die, means for reciprocating said die, and automatic spring pulled rotatable means coöperating with means mounted on said die for separating the molded composition from said matrix on the upward reciprocation of said die.

2. In a doll molding machine, the combination of means for molding a composition doll and means for separating said doll from said molding means, comprising a shaft, a pusher forming part of the molding means in its normal position mounted on said shaft, a crank at the end of said shaft and means for engaging said crank for rotating said pusher when said molding means is operated.

3. In a doll molding machine, a matrix for receiving a composition, a die for coaction with said matrix for compressing and shaping said composition into a doll, means for heating said matrix, means for heating said die, a cam for lowering said die into said matrix, means for adjusting the length of the circumferential edge of said cam for determining the interval during which said die is held in said matrix, and means for operating said cam.

4. In a doll molding machine, the combination of a matrix for receiving a composition, a die for coaction with said matrix for compressing and shaping said composition into a doll, means for heating said matrix, means for heating said die, an adjustable cam for lowering said die into said matrix during a predetermined interval, and means for separating said doll from said matrix comprising a shaft, a pusher forming part of said matrix pivoted on said shaft, a crank at the end of said shaft, and an arm on said die for engaging said crank on the downward movement of said die and for partly rotating said crank on the upward movement of said die.

5. In a doll molding machine, the combination of a matrix for receiving a loose granular composition, a die for coaction with said matrix for shaping and compressing said composition into a doll between said matrix and said die, means for heating said die and a matrix, means for heating said die and a cam designed to have the length of its circumferential edge adjustable for reciprocating said die and for holding the matrix and die in coöperative position for any predetermined interval for drying the doll.

6. In a doll molding machine, the combination of a die and adjustable means for operating said die and for holding said die stationary in its lowermost position comprising a revoluble shaft, two circular segmental cams mounted on said shaft in space relation with each other, a third circular segmental cam loosely mounted on said shaft between the two first mentioned cams, a shaft mounted in said third cam passing through slots in the other cams, gears on said last-mentioned shaft, teeth in said slotted cams meshing with said gears, and means for locking said gears.

7. In a doll molding machine, the combination of a matrix for receiving a composition, a die for coaction with said matrix for compressing and shaping said composition into a doll, means for heating said matrix, means for heating said die, adjustable means for operating said die and for holding said die stationary in its lowest position comprising a set of relatively movable cams and means for relatively adjusting said cams for changing the length of the circumferential operating edge of the resulting cam, and automatic means coöperating with means on said die for separating the doll from said matrix on the upward reciprocation of said die.

Signed at Newark, in the county of Essex and State of New Jersey, this 24th day of November, A. D. 1919.

STEVE RADIMAK.